US011423571B2

(12) United States Patent
Soltani Bozchalooi et al.

(10) Patent No.: US 11,423,571 B2
(45) Date of Patent: Aug. 23, 2022

(54) SYSTEMS AND METHODS FOR IMAGE-BASED COMPONENT DETECTION (71) Applicant: Ford Global Technologies, LLC, Dearborn, MI (US)

(72) Inventors: Iman Soltani Bozchalooi, Sacramento, CA (US); Alireza Rahimpour, Palo Alto, CA (US); Devesh Upadhyay, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 17/097,737

(22) Filed: Nov. 13, 2020

(65) Prior Publication Data
US 2022/0156970 A1 May 19, 2022

(51) Int. Cl.
G06K 9/00 (2022.01)
G06T 7/73 (2017.01)
G06T 7/55 (2017.01)

(52) U.S. Cl.
CPC ............... G06T 7/74 (2017.01); G06T 7/55 (2017.01); G06T 2207/20076 (2013.01); G06T 2207/30164 (2013.01)

(58) Field of Classification Search
CPC ...... G06N 3/08; G06N 20/00; G06K 9/00208; G06T 7/74; G06T 19/006; G06T 7/70; G06T 7/90; B64C 2201/127; G06F 3/017; G05D 1/0214; B25J 9/1676; H04N 7/15; H04N 7/148

USPC ............................................ 382/103; 706/12
See application file for complete search history.

(56) References Cited

U.S. PATENT DOCUMENTS

| | | | |
|---|---|---|---|
| 7,940,960 B2 | 5/2011 | Okada | |
| 8,311,954 B2* | 11/2012 | Ning | G06V 40/23 706/12 |
| 9,280,827 B2* | 3/2016 | Tuzel | G06V 20/64 |
| 10,074,054 B2 | 9/2018 | Adams et al. | |

OTHER PUBLICATIONS

Hagelskjaer, et al., Bayesian Optimization of 3D Feature Parameters for 6D Pose Estimation, ResearchGate, Conference Paper, Jan. 2019, pp. 1-9.

* cited by examiner

Primary Examiner — Phuoc H Doan
(74) Attorney, Agent, or Firm — Burris Law, PLLC (57) ABSTRACT A method includes detecting, for each of a plurality of images, a plurality of key points, where each of the plurality of images represents an object of an assembly system. The method includes generating, for each of the plurality of images, a correspondence between the plurality of key points, and generating, for each of the plurality of images, a reference region based on the correspondence between the plurality of key points. The method includes identifying, for each of the plurality of images, a reference key point among the plurality of key points based on the reference region, and determining a pose of the object based on the reference key point of each of the plurality of images and a reference pose of the object.

20 Claims, 11 Drawing Sheets

SYSTEMS AND METHODS FOR IMAGE-BASED COMPONENT DETECTION

FIELD

The present disclosure relates to a system and/or method for image-based component detection.

BACKGROUND

The statements in this section merely provide background information related to the present disclosure and may not constitute prior art.

In a manufacturing environment, object detection and pose estimation is utilized to perform complex and automated assembly tasks. As an example, a control system may perform a machine-learning routine to detect a particular object, determine the pose of the object, and instruct another manufacturing system, such as a robot or machining device, to perform an automated tasks based on the pose. However, machine-learning routines may require large amounts of training data to properly train the control system to accurately and consistently perform machine-learning routines. These issues associated with machine-learning routines performed by control systems, among other issues, are addressed by the present disclosure.

SUMMARY

This section provides a general summary of the disclosure and is not a comprehensive disclosure of its full scope or all of its features.

The present disclosure provides a method including detecting, for each of a plurality of images, a plurality of key points, where each of the plurality of images represents an object of an assembly system. The method includes generating, for each of the plurality of images, a correspondence between the plurality of key points, and generating, for each of the plurality of images, a reference region based on the correspondence between the plurality of key points. The method includes identifying, for each of the plurality of images, a reference key point among the plurality of key points based on the reference region, and determining a pose of the object based on the reference key point of each of the plurality of images and a reference pose of the object.

In some forms, detecting, for each of the plurality of images, the plurality of key points further includes providing each of the plurality of images to a convolutional layer to generate a plurality of feature maps, providing each of the plurality of feature maps to a first pooling layer to generate a plurality of reduced images, providing each of the plurality of reduced images to a second pooling layer to generate a plurality of heat maps, and providing the plurality of heat maps to a stacking layer to generate the plurality of key points for each of the plurality of images.

In some forms, the method further includes obtaining a plurality of estimated transformation matrices based on a known set of key points from among the plurality of key points, projecting a remaining set of key points from among the plurality of key points based on the estimated transformation matrices and calibration information of an image sensor, and generating a prior probability distribution for each of the remaining set of key points, where the correspondence between the plurality of key points is further based on the prior probability distribution.

In some forms, the method further includes generating a posterior probability distribution based on the prior probability distribution and a gaussian distribution for each of the remaining set of key points, where the reference region is further based on the posterior probability distribution of each of the remaining set of key points.

In some forms, the method further includes identifying a given excitation from among a plurality of excitations of the posterior probability distribution based on an intensity value of the plurality of excitations, where the reference key point among the plurality of key points is further based on the given excitation.

In some forms, the method further includes updating at least one estimated transformation matrix from among the plurality of estimated transformation matrices based on the reference key point, where determining the pose of the object based on the reference key point of each of the plurality of images and the reference pose of the object is further based on the updated at least one estimated transformation matrix.

In some forms, the method further includes identifying the known set of key points from among the plurality of key points, where the known set of key points is identified in response to, for each of the set of key points, a corresponding estimated transformation matrix from among the estimated transformation matrices has an error value that is less than a threshold error value.

In some forms, the method further includes, for each of the plurality of images, identifying a pixel position of the reference key point, determining a plurality of disparity values based on the pixel position of the reference key point of each of the plurality of images, and determining an average of the plurality of disparity values, where the pose of the object is further based on the average of the plurality of disparity values.

The present disclosure provides a system including a processor and a nontransitory computer-readable medium including instructions that are executable by the processor. The instructions include detecting, for each of a plurality of images, a plurality of key points, where each of the plurality of images represents an object of an assembly system. The instructions include generating, for each of the plurality of images, a correspondence between the plurality of key points, and generating, for each of the plurality of images, a reference region based on the correspondence between the plurality of key points. The instructions include identifying, for each of the plurality of images, a reference key point among the plurality of key points based on the reference region, and determining a pose of the object based on the reference key point of each of the plurality of images and a reference pose of the object.

In some forms, the instructions for detecting, for each of the plurality of images, the plurality of key points further includes providing each of the plurality of images to a convolutional layer to generate a plurality of feature maps, providing each of the plurality of feature maps to a first pooling layer to generate a plurality of reduced images, providing each of the plurality of reduced images to a second pooling layer to generate a plurality of heat maps, and providing the plurality of heat maps to a stacking layer to generate the plurality of key points for each of the plurality of images.

In some forms, the instructions further include obtaining a plurality of estimated transformation matrices based on a known set of key points from among the plurality of key points, projecting a remaining set of key points from among the plurality of key points based on the estimated transformation matrices and calibration information of an image sensor, and generating a prior probability distribution for each of the remaining set of key points, where the correspondence between the plurality of key points is further based on the prior probability distribution.

In some forms, the instructions further include generating a posterior probability distribution based on the prior probability distribution and a gaussian distribution for each of the remaining set of key points, where the reference region is further based on the posterior probability distribution of each of the remaining set of key points.

In some forms, the instructions further include identifying a given excitation from among a plurality of excitations of the posterior probability distribution based on an intensity value of the plurality of excitations, where the reference key point among the plurality of key points is further based on the given excitation.

In some forms, the instructions further include updating at least one estimated transformation matrix from among the plurality of estimated transformation matrices based on the reference key point, where determining the pose of the object based on the reference key point of each of the plurality of images and the reference pose of the object is further based on the updated at least one estimated transformation matrix.

In some forms, the instructions further include identifying the known set of key points from among the plurality of key points, where the known set of key points is identified in response to, for each of the set of key points, a corresponding estimated transformation matrix from among the estimated transformation matrices has an error value that is less than a threshold error value.

In some forms, the instructions further include, for each of the plurality of images, identifying a pixel position of the reference key point, determining a plurality of disparity values based on the pixel position of the reference key point of each of the plurality of images, and determining an average of the plurality of disparity values, where the pose of the object is further based on the average of the plurality of disparity values.

The present disclosure provides a method including detecting, for each of a plurality of images, a plurality of key points, where each of the plurality of images represents an object of an assembly system. The method includes obtaining a plurality of estimated transformation matrices based on a known set of key points from among the plurality of key points. The method includes projecting a remaining set of key points from among the plurality of key points based on the estimated transformation matrices and calibration information of an image sensor. The method includes generating a prior probability distribution for each of the plurality of key points. The method includes generating, for each of the plurality of images, a posterior probability distribution based on the prior probability distribution and a gaussian distribution for each of the plurality of key points. The method includes identifying, for each of the plurality of images, a reference region based on the posterior probability distribution. The method includes identifying, for each of the plurality of images, a reference key point among the plurality of key points based on the reference region. The method includes determining a pose of the object based on the reference key point of each of the plurality of images and a reference pose of the object.

In some forms, the method further includes identifying a given excitation from among a plurality of excitations of the posterior probability distribution based on an intensity value of the plurality of excitations, where the reference key point among the plurality of key points is further based on the given excitation.

In some forms, the method further includes updating at least one estimated transformation matrix from among the plurality of estimated transformation matrices based on the reference key point, where determining the pose of the object based on the reference key point of each of the plurality of images and the reference pose of the object is further based on the updated at least one estimated transformation matrix.

In some forms, the method further includes identifying the known set of key points from among the plurality of key points, where the known set of key points is identified in response to, for each of the set of key points, a corresponding estimated transformation matrix from among the estimated transformation matrices has an error value that is less than a threshold error value.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a pose estimation system configured to detect an object and determine a pose of the object. In one form, the pose estimation system performs deep learning routines to detect a plurality of key points of an image including an object. The pose estimation system is configured to perform a Bayesian inference statistical routine to identify a reference key point of the object and determines a pose of the object based on the reference key point and a reference pose of the object. By performing the Bayesian inference statistical routines described herein, the pose estimation system accurately determines the pose of the object, reduces the amount of iterations needed to train the deep learning networks to detect and project key points of the object, and reduces the computing resources needed to determine the pose of the object. It should be readily understood that the pose determination control system of the present disclosure addresses other issues and should not be limited to the examples provided herein.

Figure 1:
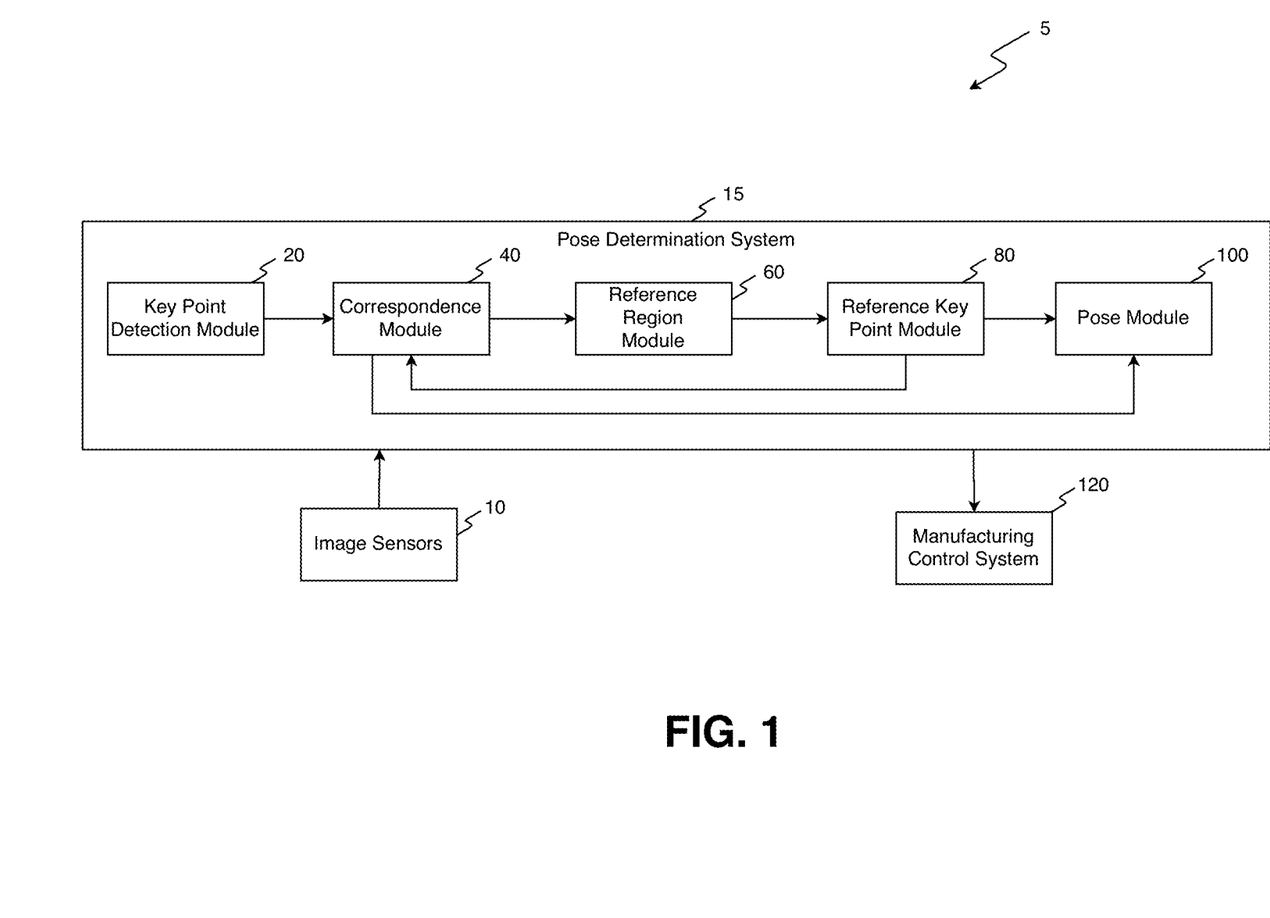
FIG. 1 illustrates a functional block diagram of a pose determination control system for inspecting a component in accordance with the teachings of the present disclosure.

Referring to FIG. 1, an environment 5 for testing a component of a manufacturing process (e.g., a vehicle) is provided. The environment 5 generally includes image sensors 10, a pose determination system 15, and a manufacturing control system 120. While the pose determination system 15 and the manufacturing control system 120 are illustrated as part of the environment 5, it should be understood that the pose determination system 15 and/or the manufacturing control system 120 may be positioned remotely from the environment 5 in other forms. In one form, the image sensors 10, the pose determination system 15, and the manufacturing control system 120 are communicably coupled using a wired and/or wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one form, the image sensors 10 provide image data of the environment 5 to the pose determination system 15 and include, but are not limited to: a two-dimensional (2D) camera, a 3D camera, a stereo vision camera, an infrared sensor, a radar scanner, a laser scanner, a light detection and ranging (LIDAR) sensor, and/or an ultrasonic sensor. As an example, the image sensors 10 are stereo cameras that are arranged to obtain a left-sided image of an object and a right-sided image of the object. As described below in further detail, the pose determination system 15 is configured to determine the pose of the object based on the left-sided and right-sided images.

In one form, the manufacturing control system 120 is configured to control a manufacturing process associated with the object based on a pose thereof, as determined by the pose determination system 15. As an example, the manufacturing control system 120 may instruct an external system (e.g., a robot, a mobile workpiece, among others) to adjust the orientation and/or position of the object based on the determined pose. As another example, the manufacturing control system 120 may generate a notification representing the determined pose (e.g., a visual and/or auditory alert if the pose of the object deviates from a reference pose beyond a predetermined amount).

In some forms, the pose determination system 15 includes a key point detection module 20, a correspondence module 40, a reference region module 60, a reference key point module 80, and a pose module 100. It should be readily understood that any one of the components of the pose determination system 15 can be provided at the same location or distributed at different locations (e.g., at one or more edge computing devices) and communicably coupled accordingly. Details regarding the pose determination system 15 is described in the following in association with the left-sided image, but is also applicable to the right-sided image.

Figure 2A:
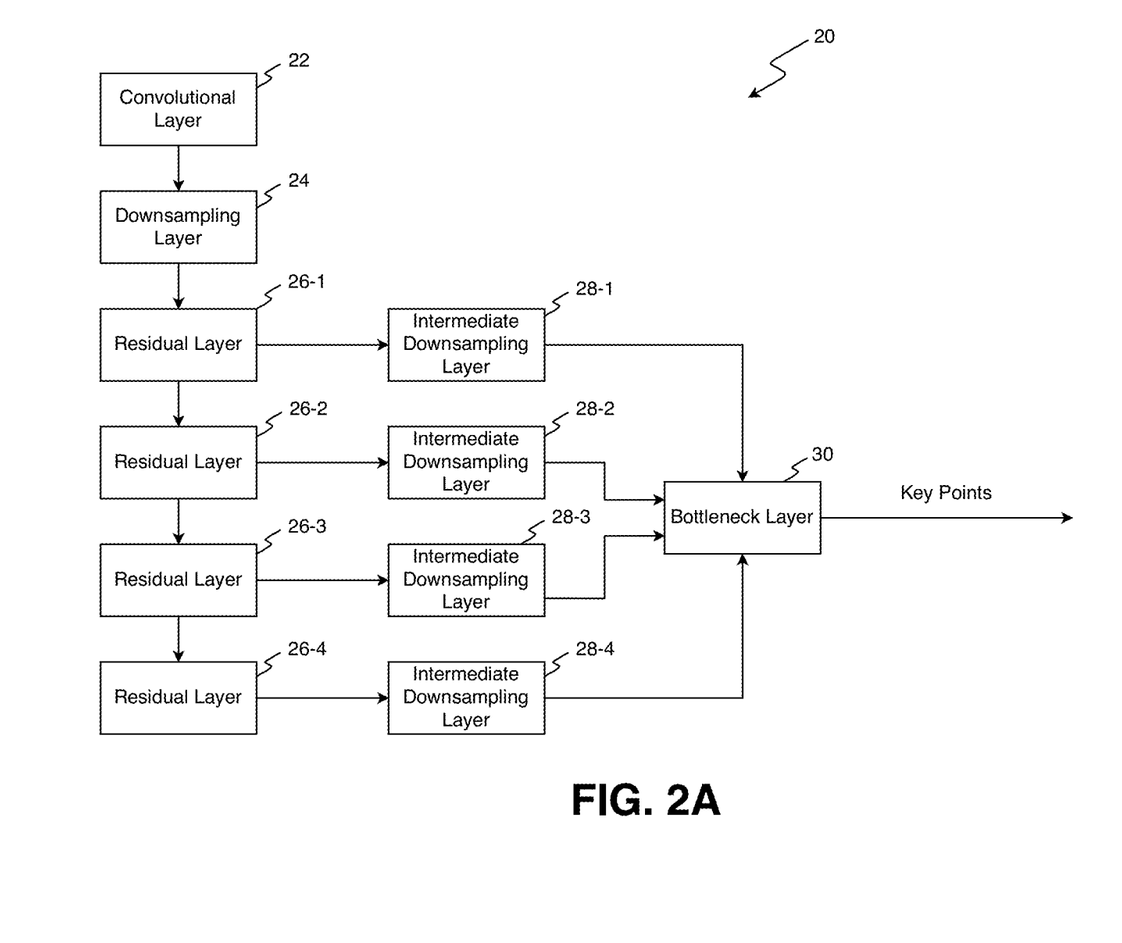
FIG. 2A illustrates a functional block diagram of a key point detection module of the pose determination control system of FIG. 1 in accordance with the teachings of the present disclosure.

In one form and referring to FIG. 1 and FIG. 2A, the key point detection module 20 is configured to detect a plurality of key points of the images representing the object. In one form, the key point detection module 20 is a deep convolutional neural network configured to perform various known image-processing routines to obtain the plurality of key points of the image. In one form, the key point detection module 20 includes a convolutional layer 22, a downsampling layer 24, residual layers 26-1, 26-2, 26-3, 26-4 (collectively referred to as "residual layers 26"), intermediate downsampling layers 28-1, 28-2, 28-3, 28-4 (collectively referred to as "intermediate downsampling layers 28"), and bottleneck layer 30. It should be understood that the key point detection module 20 may be implemented by other known image processing systems and/or neural networks and is not limited to the examples described herein. It should also be understood that the key point detection module 20 may be trained in accordance with various known training routines, and the description of various training routines are omitted from the description for brevity.

In one form, the convolutional layer 22 is configured to perform a convolution routine on the images to generate a plurality of feature maps. The convolutional layer 22 may be defined by any suitable combination of parameters including, but not limited to: kernel dimensions, number of kernels, stride values, padding values, input/output channels, bit depths, feature map widths/lengths, and rectified linear unit (ReLU) activation layers. As an example implementation of the convolutional layer 22, a kernel (e.g., a 7×7 kernel) may by iteratively applied to various pixels of the obtained images in accordance with a defined stride (e.g., a stride value of 2). During each iteration, the convolutional layer 22 performs a convolution routine (e.g., a scalar product routine) based on a set of pixels in which the kernel is overlayed. The result of the convolution function at each iteration is output as a pixel value in a feature map (i.e., the feature map).

In one form, the downsampling layer 24 is configured to reduce the width and/or length of the feature maps generated by the convolution layer 22 (i.e., the feature map). The downsampling layer 24 may be defined by any suitable combination of parameters including, but not limited to: the type of downsampling routine (e.g., a maximum pooling routine, an average pooling routine, an L2-norm pooling routine, among other downsampling routines), kernel dimensions, and sliding values. As an example, the downsampling layer 24, may be a maximum pooling layer implemented by a 2×2 kernel and a stride value of 2.

In one form, the residual layers 26 are configured to generate a plurality of heat maps based on the reduced images generated by the downsampling layer 24. In some forms, each of the residual layers 26 is a residual block including one or more convolution layers similar to the convolutional layer 22 described above, a downsampling layer similar to the downsampling layer 24 described above, and/or a ReLU activation layer. In some forms, the inputs and outputs of the plurality of convolution layers of the residual layers 26 are selectively combined to increase the accuracy of the key point detection. As an example, each residual layer 26 includes eight convolutional layers that are defined by a 3×3 kernel and a sliding value of 1, and at least a set of the outputs of the eight convolutional layers are combined with other inputs of the eight convolutional layers. Furthermore, each residual layer 26 may be defined by a maximum pooling layer to further reduce the feature map generated by the eight convolutional layers. In some forms, the first residual layer 26-1 may include N output channels, the second residual layer 26-2 may include 2×N output channels, the third residual layer 26-3 includes 3×N output channels, and the fourth residual layer 26-4 includes 4×N output channels, where N is equal to a number of key points to be detected by the key point detection module 20. As such, the output (i.e., the heat map) generated by each of the residual layers 26 is based on the features of the convolutional layers, the downsampling layer, and/or the number of output channels of each residual layer.

In one form, the intermediate downsampling layers 28 are similar to the downsampling layer 24. The intermediate downsampling layers 28 are configured to reduce the number of output channels from the heat map generated by the corresponding residual layer 26 to N output channels. In one form, the bottleneck layer 30 is configured to generate the plurality of key points for each image. In one form, the bottleneck layer 30 stacks each of the outputs from the intermediate downsampling layers 28 such that an aggregate heat map with 4×N output channels are generated, and then further reduces the number of output channels of the aggregate heat map. In some forms, the aggregate heat map represents the detected key points of the component of the image.

Figure 2B:
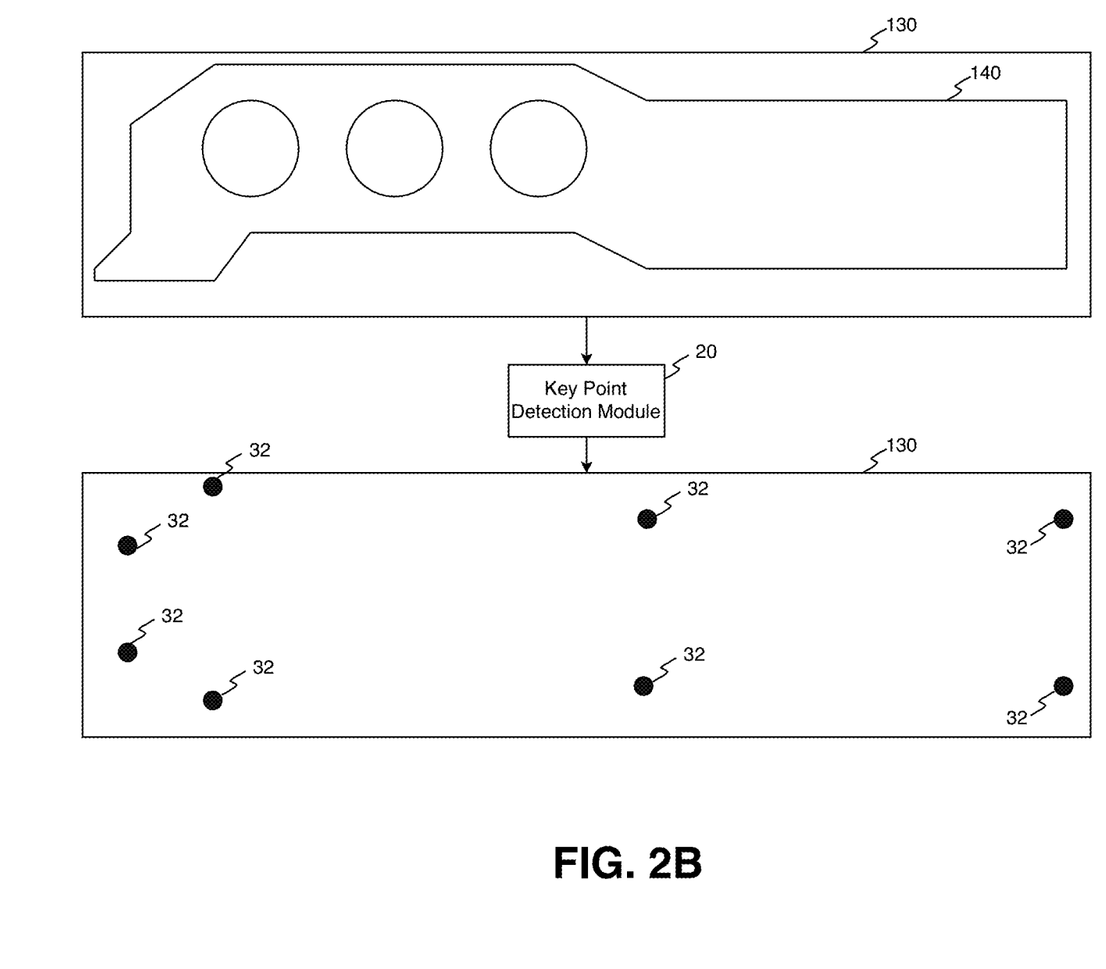
FIG. 2B illustrates one or more key points generated by the key point detection module in accordance with the teachings of the present disclosure.

In an example application and as shown in FIG. 2B, left-sided image 130 includes an object 140 from an assembly system of the environment 5. The key point detection module 20, which may be the deep convolutional neural network described herein, obtains the left-sided image 130 and detects N key points 32 by sequentially providing the left-sided image 130 to the convolutional layer 22, the downsampling layer 24, the residual layers 26, the intermediate downsampling layers 28, and the bottleneck layer 30.

Figure 3A:
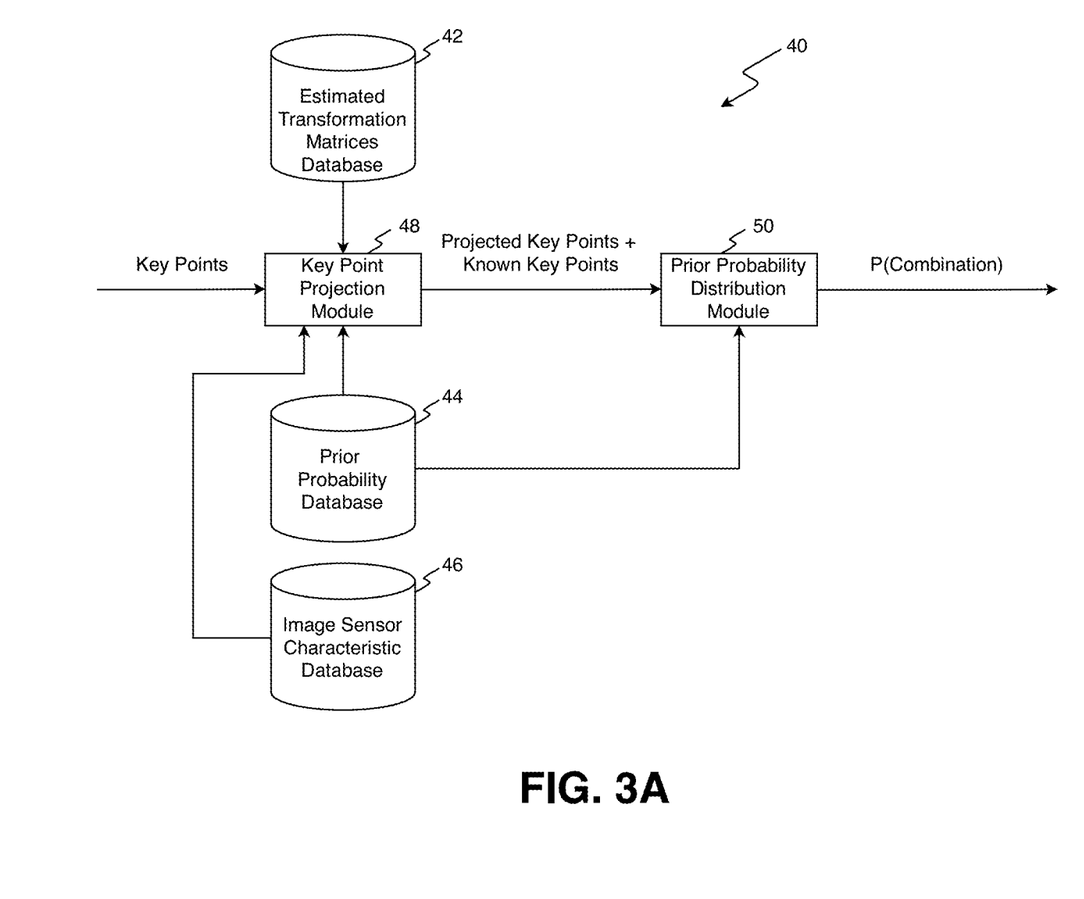
FIG. 3A illustrates a functional block diagram of a correspondence module of the pose determination control system of FIG. 1 in accordance with the teachings of the present disclosure.

In one form and referring to FIG. 1 and FIG. 3A, the correspondence module 40 is configured to generate a correspondence between the N key points 32. In one form, the correspondence module 40 includes an estimated transformation matrices database 42, a prior probability database 44, an image sensor characteristic database 46, a key point projection module 48, and a prior probability distribution module 50.

In one form, the estimated transformation matrices database 42 includes a plurality of estimated transformation entries, where each estimated transformation entry includes one or more rotation matrices and translation matrices for a given set of key points 32. In one form, the rotation matrices and translation matrices indicate a rotation and translation, respectively, utilized to project one of the key points 32 from the given set to additional key points that may have not been detected and/or confidently detected by the key point detection module 20. In some forms, the estimated transformation entries may be updated as additional iterations of the routines performed by the reference key point module 80 described below are performed.

In one form, the prior probability database 44 includes a plurality of prior probability entries, where each prior probability entry includes a prior probability for a given pixel coordinate indicating a likelihood in which a key point can be confidently detected at the given pixel coordinate. In some forms, the prior probability for each pixel coordinate is defined while the key point detection module 20 is trained and/or as additional iterations of the routines described herein are performed. In some forms, the prior probability for each pixel coordinate collectively have a sum of 1. It should be understood that the prior probabilities of the pixel coordinates can be defined using other methods (e.g., an uninformative prior, Jeffreys prior, Bernardo's reference prior, conjugate prior, among others) and is not limited to the examples provided herein.

In one form, the image sensor characteristic database 46 includes various characteristics of the image sensors 10 that are utilized for transforming the 2D pixel coordinate of the key points 32 to a 3D position within the environment 5. As an example, the image sensor characteristic database 46 includes a calibration matrix for each of the image sensors 10, where the calibration matrix represents the intrinsic information of the image sensors 10 (i.e., the characteristics of the image sensor 10). Example intrinsic information includes but is not limited to: focal lengths in the x and y dimensions, skew between the axes of the image sensor 10 due to the image sensor 10 not being mounted perpendicular to an optical axis, an optical center expressed in pixel coordinates, and/or an aspect ratio. It should be understood that the image sensor characteristic database 46 may include other characteristics of the image sensors 10 and is not limited to the characteristics described herein.

In one form, the key point projection module 48 identifies a set of known key points 32 (e.g., a combination of three key points 32) that are confidently determined to be accurate. As an example, to identify the set of known key points 32 that are confidently determined to be accurate, the key point projection module 48 compares the location of the pixel coordinates of the key points 32 and identifies the prior probability entries from the prior probability database 44 having the same pixel coordinates. Accordingly, the key point projection module 48 identifies the set of known key points based on the prior probabilities of the identified prior probability entries. As an example, the key point projection module 48 identifies a key point 32 as part of the set of known key points if the corresponding prior probability is greater than a threshold value. As another example, the key point projection module 48 identifies a predetermined number of key points 32 (e.g., three key points 32) having the highest prior probability as part of the set.

In response to identifying the given set of key points 32, the key point projection module 48 obtains a plurality of estimated transformation matrices associated with the known set of key points 32. As an example, to obtain the plurality of estimated transformation matrices, the key point projection module 48 identifies an estimated transformation entry from the estimated transformation matrices database 42 that matches the known set of key points 32.

In one form, the key point projection module 48 is configured to project additional key points based on the known set of key points 32, the obtained estimated transformation matrices, and the calibration matrix from the image sensor characteristic database 46. As an example, if the key point projection module 48 identifies three key points 32 as part of the known set and a total of eight key points 32 are identified by the key point detection module 20, the key point projection module 48 projects five key points 32 based on the three key points 32 of the known set, the rotation/translation matrices associated with at least one of the three key points 32 of the known set, and the calibration matrix.

In one form, the prior probability distribution module 50 is configured to generate the correspondence between the set of known key points 32 and the projected additional key points by determining a prior probability distribution for the combination of the known set of key points 32 and the projected additional key points. In some forms, the prior probability distribution module 50 identifies the prior probability in the prior probability database 44 associated with the pixel coordinates of the projected additional key points, as described above. Subsequently, the prior probability distribution module 50 determines the prior probability distribution (denoted as P(Combination) in FIG. 3A) for the combination of the known set of key points 32 and the projected additional key points based on a least square projection error. In some forms, lower least square projection errors correspond to a higher prior, and vice versa. In one form, the prior probability distribution module 50 may designate one of the projected additional key points as an outlier when the least square projection error is greater than a threshold value.

Figure 3B:
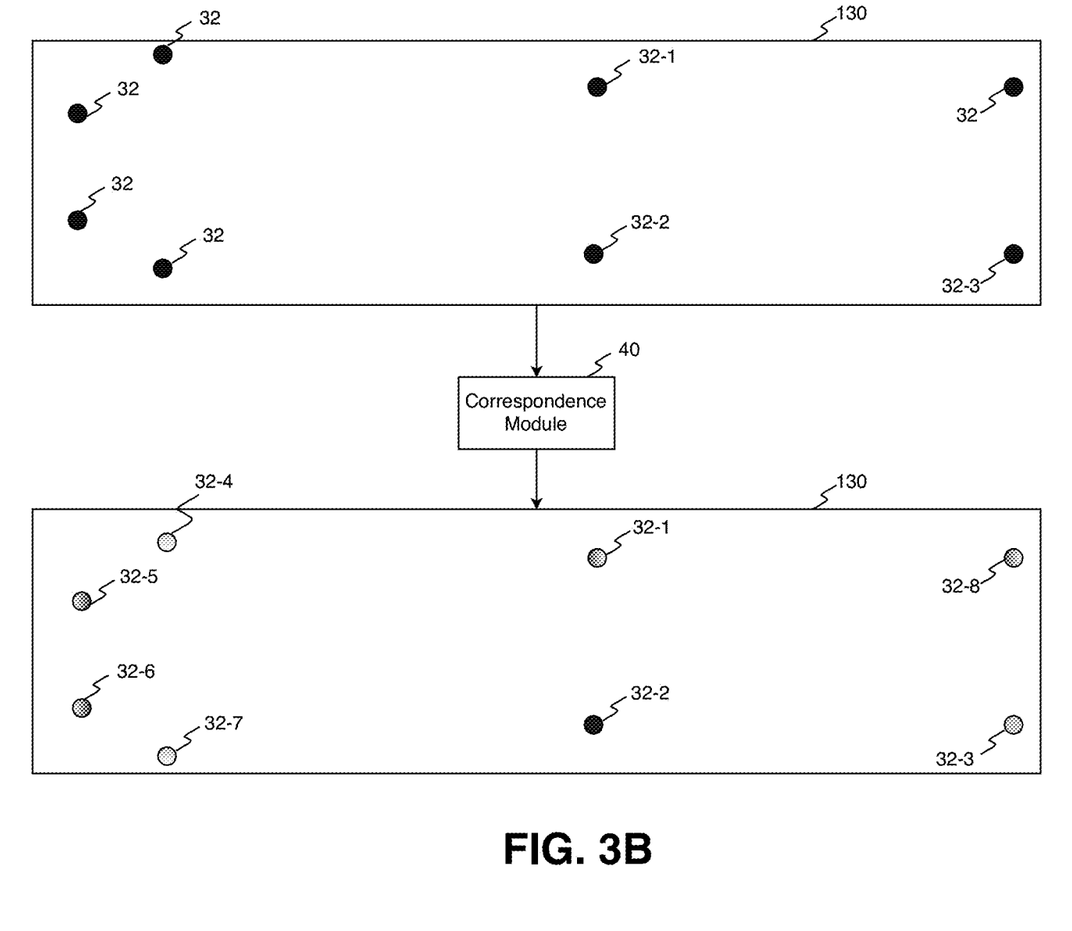
FIG. 3B illustrates one or more remaining key points generated by the correspondence module in accordance with the teachings of the present disclosure.

In an example application and as shown in FIG. 3B, the left-sided image 130, which includes the key points 32, is provided to the correspondence module 40. In response to receiving the left-sided image 130, the key point projection module 48 of the correspondence module 40 projects additional key points 32-5, 32-6, 32-7, 32-8 based on a known set of key points 32-1, 32-2, 32-3, the estimated transformation matrices associated with one of the key points 32-1, 32-2, 32-3, and the calibration matrix of the image sensor 10. Furthermore, the prior probability distribution module 50 of the correspondence module 40 determines the correspondence between the known set of key points 32-1, 32-2, 32-3 and the projected additional key points 32-5, 32-6, 32-7, 32-8 based on the probability distribution for the combination of the key points 32-1, 32-2, . . . 32-8 (i.e., P(Combination)).

Figure 4A:
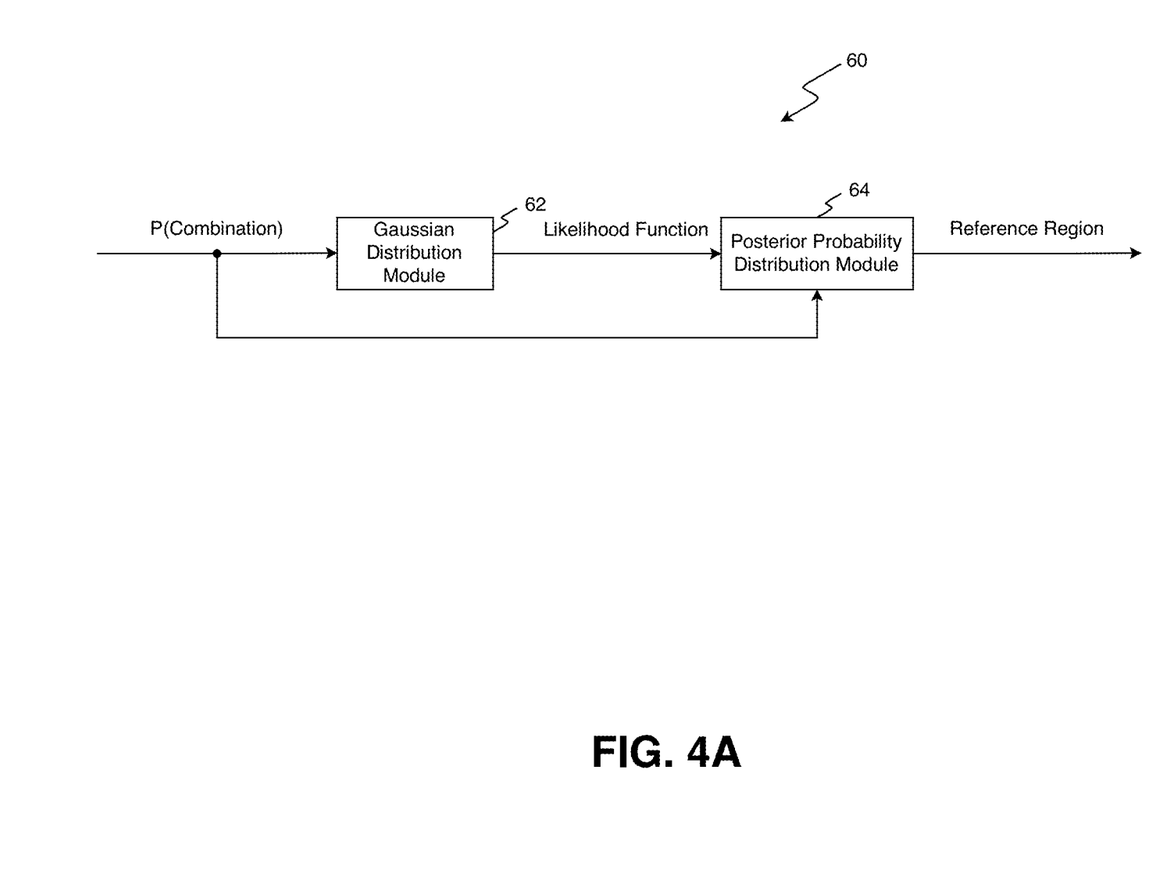
FIG. 4A illustrates a functional block diagram of a reference region module of the pose determination control system of FIG. 1 in accordance with the teachings of the present disclosure.

In one form and referring to FIG. 1 and FIG. 4A, the reference region module 60 is configured to identify a reference region based on set of key points 32-1, 32-2, 32-3 and the projected additional key points 32-5, 32-6, 32-7, 32-8 (collectively referred to as "key points 32-x" hereinafter). In one form, the reference region module 60 includes a gaussian distribution module 62 and a posterior probability distribution module 64.

In one form, the gaussian distribution module 62 is configured to generate a gaussian distribution for the key points 32-x. In some forms, the gaussian distribution is assumed to be the likelihood function, as each of the respective key points 32-x has the highest likelihood probability at the corresponding pixel coordinates due to its small projection error, and the likelihood probability exponentially decays at the surrounding pixel coordinates to the increasing projection error. Accordingly, the posterior probability distribution module 64 is configured to generate the posterior probability distribution based on the prior probability distribution of the key points 32-x (P(Combination) in FIG. 3A), the likelihood function (i.e., the gaussian distribution generated by the gaussian distribution module 62), and a marginal likelihood representing the accuracy of the gaussian distribution (e.g., a normalizing constant value between 0 and 1). In some forms, the resulting posterior probability distribution is represented as the reference region in which a reference key point is located, as described below in further detail.

Figure 4B:
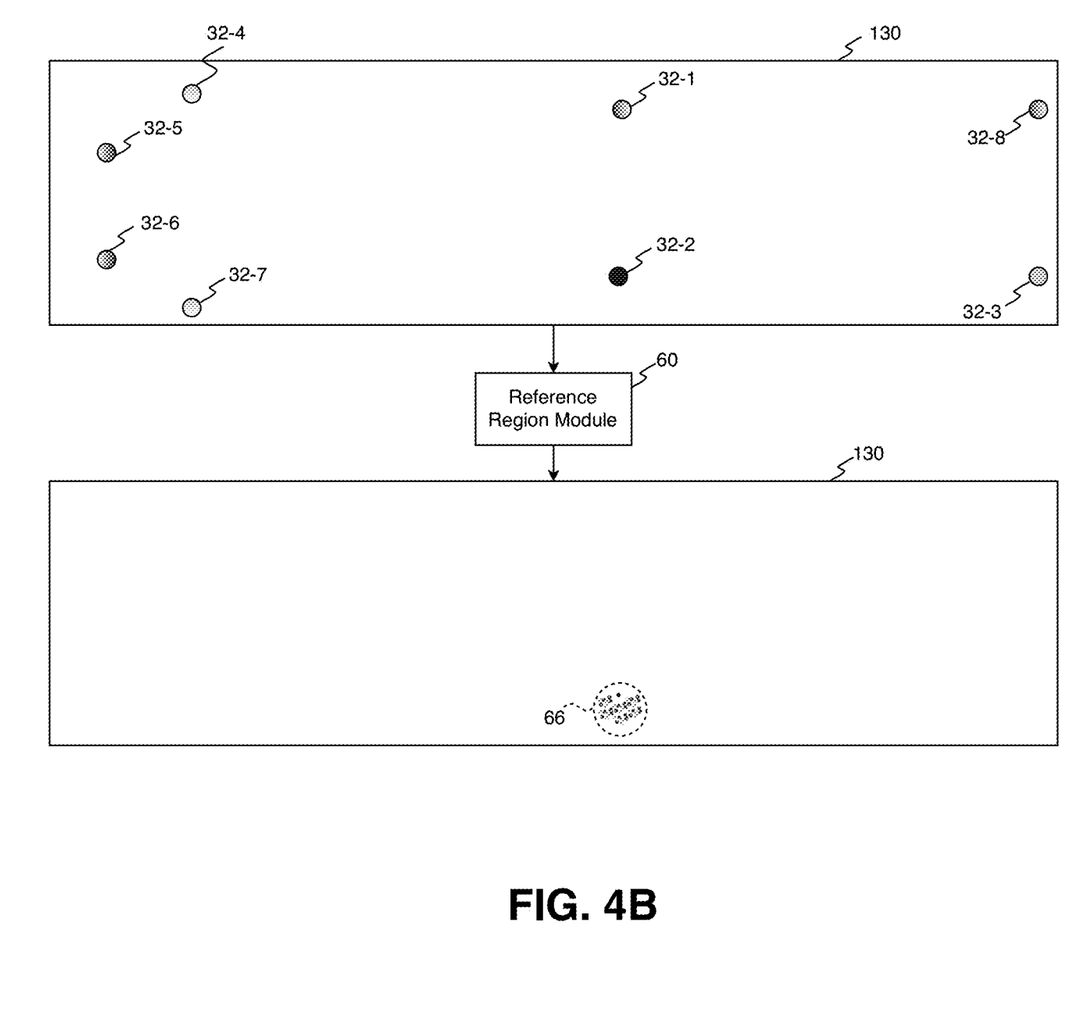
FIG. 4B illustrates a reference region generated by the reference region module in accordance with the teachings of the present disclosure.

In an example application and as shown in FIG. 4B, the left-sided image 130, which includes the key points 32-x, is provided to the reference region module 60. The gaussian distribution module 62 of the reference region module 60 generates the likelihood function, and the posterior probability distribution module 64 of the reference region module 60 generates the posterior probability distribution, which is represented as reference region 66 in FIG. 4B, in accordance with Bayesian inference statistical relations.

Figure 5A:
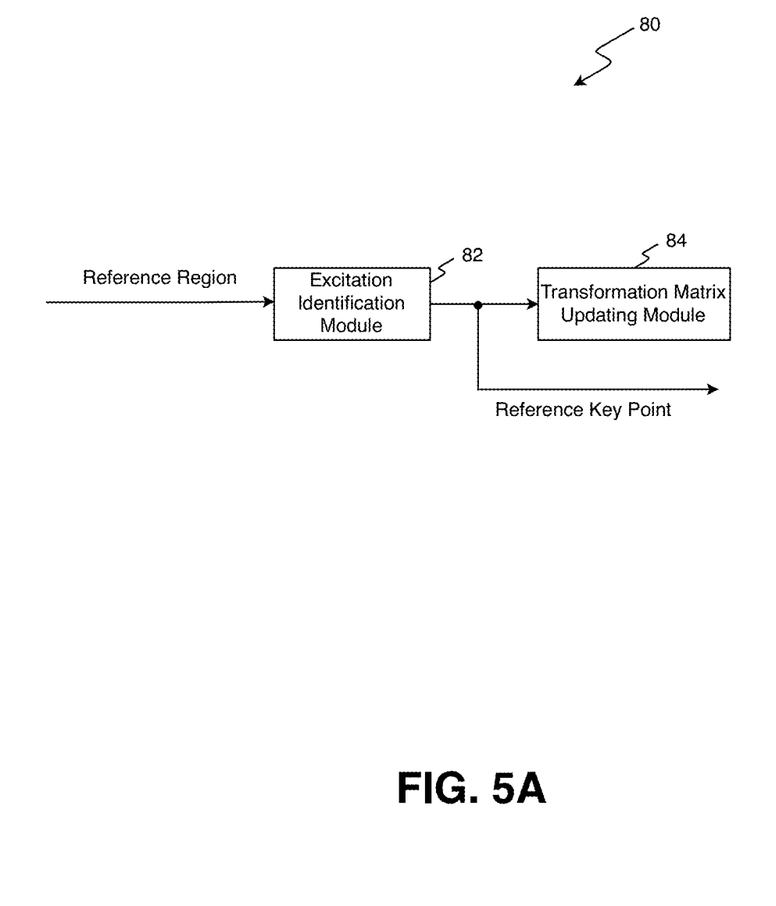
FIG. 5A illustrates a functional block diagram of a reference key point module of the pose determination control system of FIG. 1 in accordance with the teachings of the present disclosure.

Referring to FIG. 1 and FIG. 5A, in one form, the reference key point module 80 is configured to identify a reference key point based on the posterior probability distribution (i.e., the reference region 66). In one form, the reference key point module 80 includes an excitation identification module 82 and a transformation matrix updating module 84.

In one form, the excitation identification module 82 is configured to identify a given excitation from among a plurality of excitations within the reference region 66, as the reference key point, based on the intensity values of the plurality of excitations. As an example, the excitation identification module 82 identifies the excitation having the maximum intensity value within the region 66 as the reference key point.

In one form, the transformation matrix updating module 84 is configured to update the transformation matrix for the given set of key points 32 utilized by the correspondence module 40 during the projection of the additional key points 32 described above based on the identified reference key point. As an example, the transformation matrix updating module 84 updates at least one of the rotation matrix and the translation matrix based on the identified reference key point. Similarly, the transformation matrix updating module 84 may update the transformation matrices utilized for projecting the additional key points based on the identified reference key point. As described below in further detail, the pose module 100 is configured to determine the pose of the object 140 based on the updated rotation and/or translation matrices.

Figure 5B:
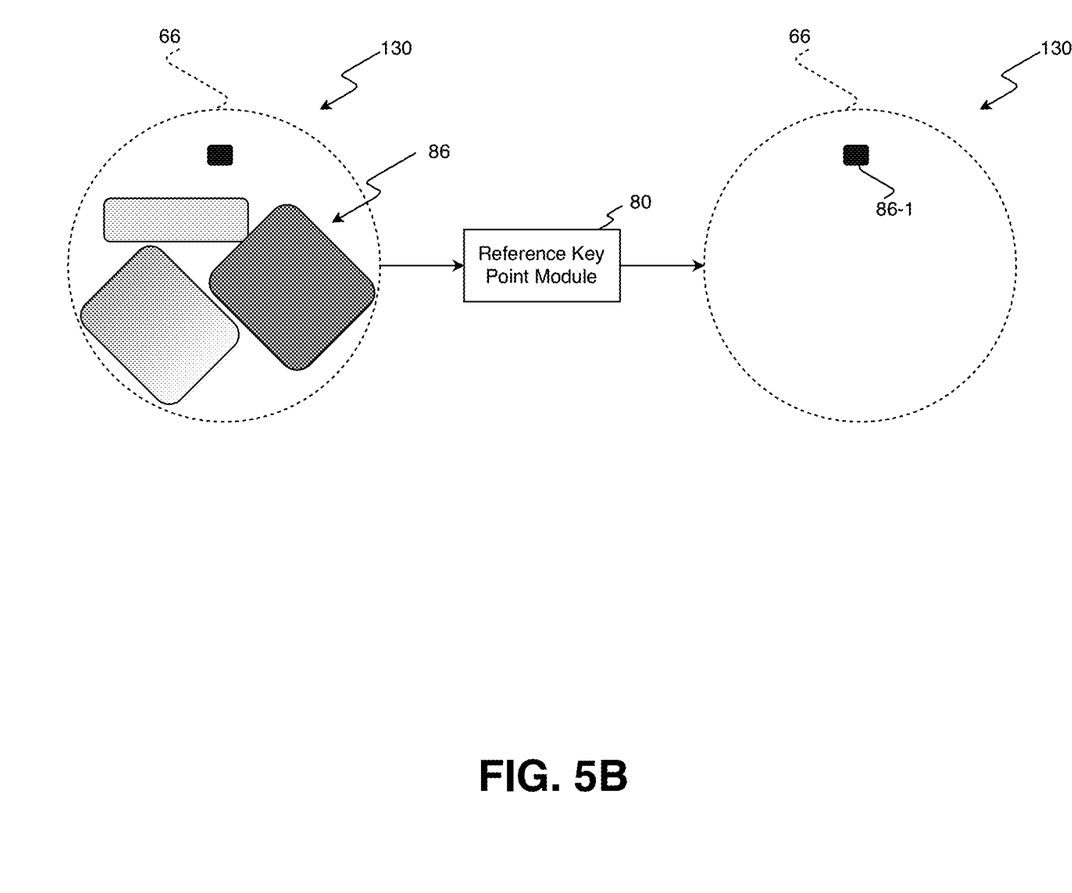
FIG. 5B illustrates reference key points generated by the reference key point module in accordance with the teachings of the present disclosure.

Referring to FIG. 5B, in an example application, the reference region 66 includes a plurality of excitations 86 generated by the reference region module 60. The excitation identification module 82 of the reference key point module 80 identifies excitation 86-1 as the excitation having the maximum intensity value and accordingly designates it as the reference key point.

Figure 6:
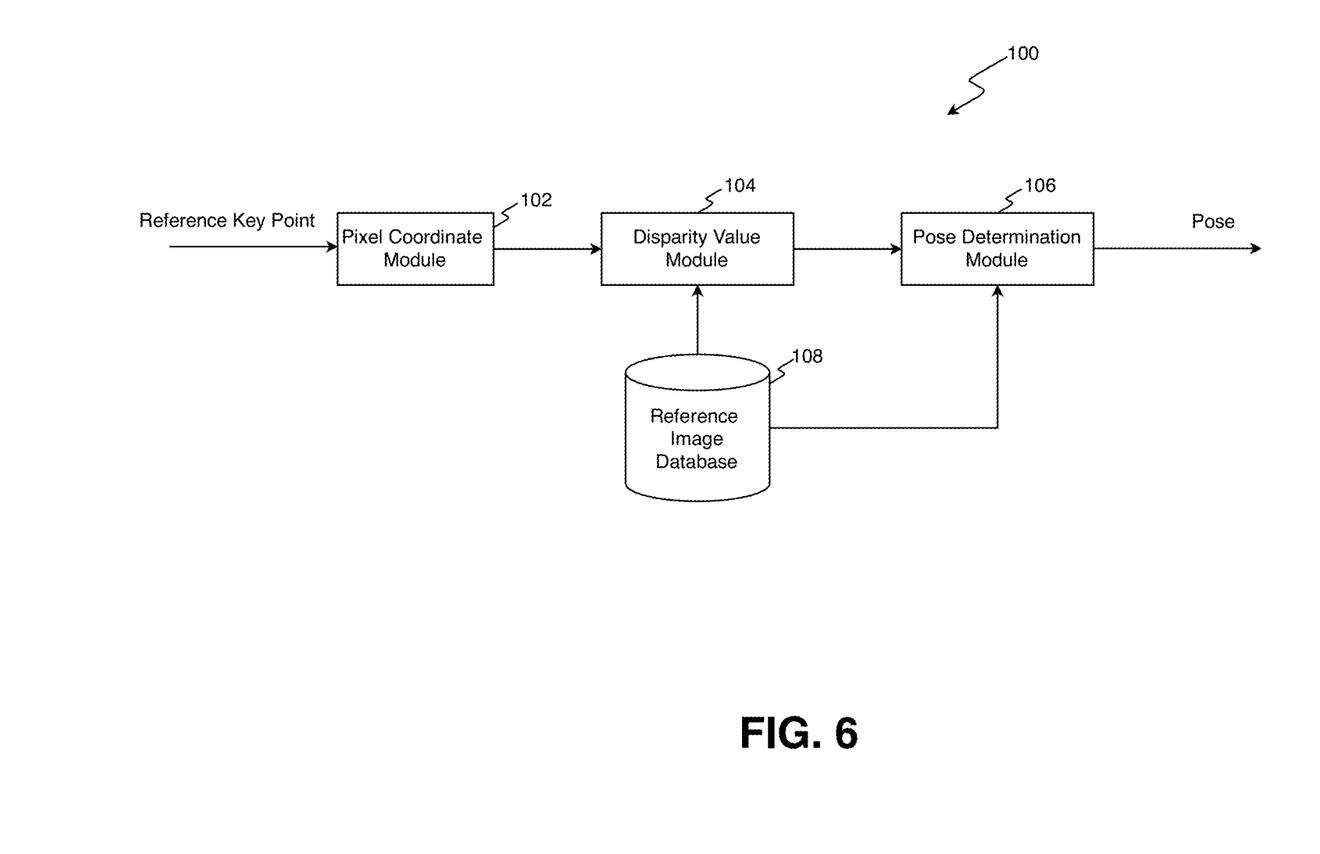
FIG. 6 illustrates a functional block diagram of a pose module of the pose determination control system of FIG. 1 in accordance with the teachings of the present disclosure.

Referring to FIG. 1 and FIG. 6, in one form, the pose module 100 is configured to determine a pose of the object of the image based on the reference key point. In one form, the pose module 100 includes a pixel coordinate module 102, a disparity value module 104, a pose determination module 106, and a reference image database 108.

In one form, the pixel coordinate module 102 is configured to identify the pixel coordinates of the reference key point. More particularly, the reference image database 108 includes a predefined pixel coordinate of the reference key points for the left-sided and right-sided images when the corresponding object is at a predefined reference pose. The reference image database 108 further includes a predefined 3D coordinate of the reference key point when the corresponding object is at a predefined reference pose.

In one form, the disparity value module 104 is configured to determine a disparity value for each of the pixel coordinates of the reference key points of the left-sided image and the right-sided image. As an example, to determine a disparity of the respective image, the disparity value module 104 is configured to perform a scale invariant feature transform (SIFT) routine or a speeded up robust feature (SURF) routine based on the pixel coordinates of the reference key point as determined by the pixel coordinate module 102 and the predefined pixel coordinates of the reference key point from the reference image database. Subsequently, the disparity value module 104 may determine the disparity value as the average of the disparity values from each of the right-sided and left-sided images. In some forms, the average disparity value represents the 3D position coordinate of the reference key point.

In one form, the pose determination module 106 determines the pose of the object in the image (e.g., object 140 of image 130) based on the average disparity value and the predefined 3D coordinate of the reference key point. As an example, the pose determination module 106 obtains the updated estimated transformation matrix associated with the reference point from the estimated transformation matrices database 42 of the correspondence module 40 to determine the rotation and/or translation of the object and, thus, the pose of the object. As provided in FIG. 1, the pose is provided to the manufacturing control system 120 to assess the position of the object prior to the object being processed.

Figure 7:
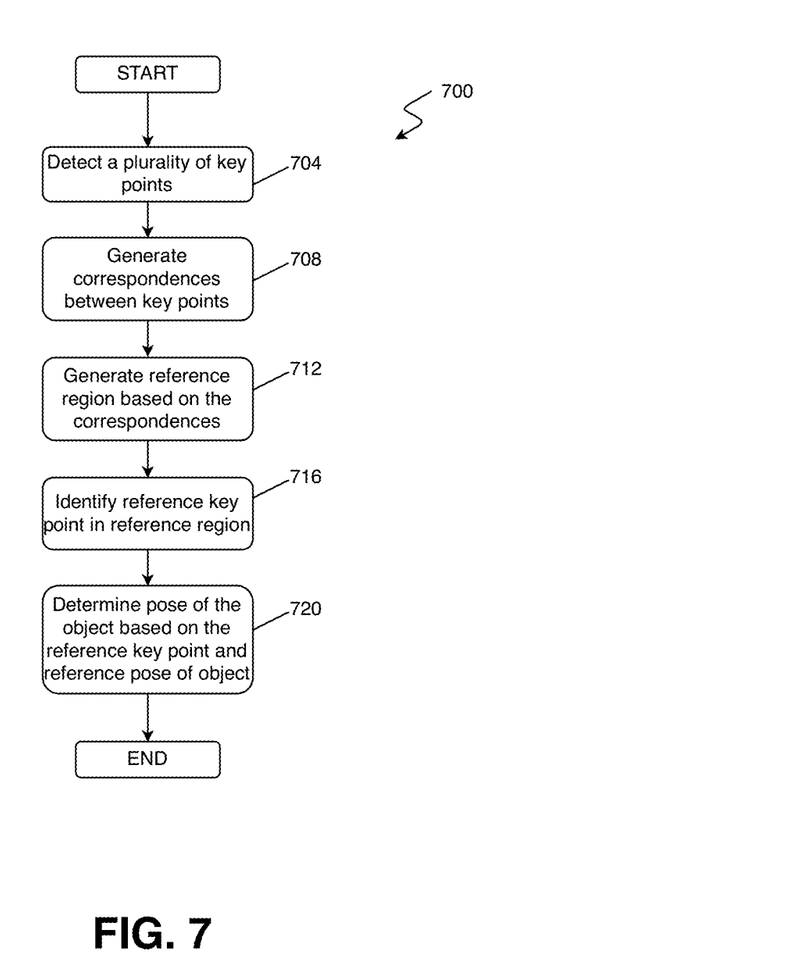
FIG. 7 illustrates an example control routine in accordance with the teachings of the present disclosure.

With reference to FIG. 7, a routine 700 for determining the pose of the object 140 in the image 130 is shown and is performed by the pose determination system 15. At 704, the pose determination system 15 detects a plurality of key points 32 of the image 130. At 708, the pose determination system 15 generates correspondences between the key points 32. At 712, the pose determination system 15 generates the reference region 66 based on the correspondences between the key points 32-x. At 716, the pose determination system 15 identifies the reference key point in the reference region 66. At 720, the pose determination system 15 determines the pose of the object based on the reference key point and the reference pose of the object as indicated by the reference image database 108. The routine 700 then ends.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality, such as, but not limited to, movement drivers and systems, transceivers, routers, input/output interface hardware, among others; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A method comprising:
   detecting, for each of a plurality of images, a plurality of key points, wherein each of the plurality of images represents an object of an assembly system;
   generating, for each of the plurality of images, a correspondence between the plurality of key points;
   generating, for each of the plurality of images, a reference region based on the correspondence between the plurality of key points;
   identifying, for each of the plurality of images, a reference key point among the plurality of key points based on the reference region; and
   determining a pose of the object based on the reference key point of each of the plurality of images and a reference pose of the object.

2. The method of claim 1, wherein detecting, for each of the plurality of images, the plurality of key points further comprises:
   providing each of the plurality of images to a convolutional layer to generate a plurality of feature maps;
   providing each of the plurality of feature maps to a first pooling layer to generate a plurality of reduced images;
   providing each of the plurality of reduced images to a second pooling layer to generate a plurality of heat maps; and providing the plurality of heat maps to a stacking layer to generate the plurality of key points for each of the plurality of images.

3. The method of claim 1 further comprising:
obtaining a plurality of estimated transformation matrices based on a known set of key points from among the plurality of key points;
projecting a remaining set of key points from among the plurality of key points based on the estimated transformation matrices and calibration information of an image sensor; and
generating a prior probability distribution for each of the remaining set of key points, wherein the correspondence between the plurality of key points is further based on the prior probability distribution.

4. The method of claim 3 further comprising generating a posterior probability distribution based on the prior probability distribution and a gaussian distribution for each of the remaining set of key points, wherein the reference region is further based on the posterior probability distribution of each of the remaining set of key points.

5. The method of claim 4 further comprising identifying a given excitation from among a plurality of excitations of the posterior probability distribution based on an intensity value of the plurality of excitations, wherein the reference key point among the plurality of key points is further based on the given excitation.

6. The method of claim 3 further comprising updating at least one estimated transformation matrix from among the plurality of estimated transformation matrices based on the reference key point, wherein determining the pose of the object based on the reference key point of each of the plurality of images and the reference pose of the object is further based on the updated at least one estimated transformation matrix.

7. The method of claim 3 further comprising identifying the known set of key points from among the plurality of key points, wherein the known set of key points is identified in response to, for each of the set of key points, a corresponding estimated transformation matrix from among the estimated transformation matrices has an error value that is less than a threshold error value.

8. The method of claim 1 further comprising:
for each of the plurality of images, identifying a pixel position of the reference key point;
determining a plurality of disparity values based on the pixel position of the reference key point of each of the plurality of images; and
determining an average of the plurality of disparity values, wherein the pose of the object is further based on the average of the plurality of disparity values.

9. A system comprising:
a processor; and
a nontransitory computer-readable medium including instructions that are executable by the processor, wherein the instructions include:
detecting, for each of a plurality of images, a plurality of key points, wherein each of the plurality of images represents an object of an assembly system;
generating, for each of the plurality of images, a correspondence between the plurality of key points;
generating, for each of the plurality of images, a reference region based on the correspondence between the plurality of key points;
identifying, for each of the plurality of images, a reference key point among the plurality of key points based on the reference region; and
determining a pose of the object based on the reference key point of each of the plurality of images and a reference pose of the object.

10. The system of claim 9, wherein the instructions for detecting, for each of the plurality of images, the plurality of key points further comprises:
providing each of the plurality of images to a convolutional layer to generate a plurality of feature maps;
providing each of the plurality of feature maps to a first pooling layer to generate a plurality of reduced images;
providing each of the plurality of reduced images to a second pooling layer to generate a plurality of heat maps; and
providing the plurality of heat maps to a stacking layer to generate the plurality of key points for each of the plurality of images.

11. The system of claim 10, wherein the instructions further comprise:
obtaining a plurality of estimated transformation matrices based on a known set of key points from among the plurality of key points;
projecting a remaining set of key points from among the plurality of key points based on the estimated transformation matrices and calibration information of an image sensor; and
generating a prior probability distribution for each of the remaining set of key points, wherein the correspondence between the plurality of key points is further based on the prior probability distribution.

12. The system of claim 11, wherein the instructions further comprise generating a posterior probability distribution based on the prior probability distribution and a gaussian distribution for each of the remaining set of key points, and wherein the reference region is further based on the posterior probability distribution of each of the remaining set of key points.

13. The system of claim 12, wherein the instructions further comprise identifying a given excitation from among a plurality of excitations of the posterior probability distribution based on an intensity value of the plurality of excitations, and wherein the reference key point among the plurality of key points is further based on the given excitation.

14. The system of claim 11, wherein the instructions further comprise updating at least one estimated transformation matrix from among the plurality of estimated transformation matrices based on the reference key point, and wherein determining the pose of the object based on the reference key point of each of the plurality of images and the reference pose of the object is further based on the updated at least one estimated transformation matrix.

15. The system of claim 11 further comprising identifying the known set of key points from among the plurality of key points, wherein the known set of key points is identified in response to, for each of the set of key points, a corresponding estimated transformation matrix from among the estimated transformation matrices has an error value that is less than a threshold error value.

16. The system of claim 9, wherein the instructions further comprise:
for each of the plurality of images, identifying a pixel position of the reference key point;
determining a plurality of disparity values based on the pixel position of the reference key point of each of the plurality of images; and determining an average of the plurality of disparity values, wherein the pose of the object is further based on the average of the plurality of disparity values.

17. A method comprising:
detecting, for each of a plurality of images, a plurality of key points, wherein each of the plurality of images represents an object of an assembly system;
obtaining a plurality of estimated transformation matrices based on a known set of key points from among the plurality of key points;
projecting a remaining set of key points from among the plurality of key points based on the estimated transformation matrices and calibration information of an image sensor;
generating a prior probability distribution for each of the plurality of key points;
generating, for each of the plurality of images, a posterior probability distribution based on the prior probability distribution and a gaussian distribution for each of the plurality of key points;
identifying, for each of the plurality of images, a reference region based on the posterior probability distribution;
identifying, for each of the plurality of images, a reference key point among the plurality of key points based on the reference region; and
determining a pose of the object based on the reference key point of each of the plurality of images and a reference pose of the object.

18. The method of claim 17 further comprising identifying a given excitation from among a plurality of excitations of the posterior probability distribution based on an intensity value of the plurality of excitations, wherein the reference key point among the plurality of key points is further based on the given excitation.

19. The method of claim 17 further comprising updating at least one estimated transformation matrix from among the plurality of estimated transformation matrices based on the reference key point, wherein determining the pose of the object based on the reference key point of each of the plurality of images and the reference pose of the object is further based on the updated at least one estimated transformation matrix.

20. The method of claim 17 further comprising identifying the known set of key points from among the plurality of key points, wherein the known set of key points is identified in response to, for each of the set of key points, a corresponding estimated transformation matrix from among the estimated transformation matrices has an error value that is less than a threshold error value.

* * * * *